United States Patent [19]

Röder

[11] 4,288,680
[45] Sep. 8, 1981

[54] APPARATUS FOR CUTTING MOULD NOTCHES FOR STRIP STEEL CUTTING TOOLS

[75] Inventor: Walter Röder, Frankfurt, Fed. Rep. of Germany

[73] Assignee: R + S Stanzformen GmbH, Frankfurt, Fed. Rep. of Germany

[21] Appl. No.: 126,390

[22] Filed: Mar. 3, 1980

[30] Foreign Application Priority Data

Mar. 8, 1979 [DE] Fed. Rep. of Germany ....... 2909140
Dec. 13, 1979 [DE] Fed. Rep. of Germany ....... 2950149

[51] Int. Cl.³ ............................................. B23K 26/08
[52] U.S. Cl. ...................... 219/121 LG; 219/121 LU; 219/121 LY; 219/121 L; 266/57; 266/61; 269/73; 83/411 R
[58] Field of Search .... 219/121 L, 121 LM, 121 LG, 219/121 LH, 121 LJ, 121 LK, 121 LY, 59.1, 60 A, 159; 266/54, 57, 61; 269/73, 51; 83/733, 411 R, 412

[56] References Cited

U.S. PATENT DOCUMENTS

| | | | |
|---|---|---|---|
| 3,226,527 | 12/1965 | Harding | 219/121 L |
| 3,330,547 | 7/1967 | Powers | 266/57 X |
| 3,350,088 | 10/1967 | Schott | 83/412 X |
| 3,535,778 | 10/1970 | Falanga et al. | 219/121 LM |
| 3,612,814 | 10/1971 | Houldcroft | 219/121 LG |
| 3,619,550 | 11/1971 | Matthews | 219/121 L |
| 4,039,799 | 8/1977 | Stumpf | 219/121 LG |

Primary Examiner—Gene Z. Rubinson
Assistant Examiner—M. Paschall

[57] ABSTRACT

Apparatus for cutting notches in the outer surface of a cylindrical drum includes a machine frame, and a laser cutting set which provides a laser beam to cut the notches in the drum. The notches are provided to allow sheet steel strips to be later fitted on the drum, and thus form a cutting tool useful in the production of collapsible box blanks. The apparatus also includes a movable carriage for supporting the laser cutting set, and a mounting shaft is supported by the carriage for rotatably supporting the drum. A drive wheel, coaxially fitted to the mounting shaft, rotates the shaft, and the drive wheel has an engagement surface which corresponds to a cutting edge diameter later defined by the positions which the cutting edges of the steel strips assume beyond the outer circumferential surface of the drum. An elongated guide member fixed to the machine frame contacts the engagement surface of the drive wheel and rotates the drive wheel together with the drum when the carriage is moved relative to the guide member. Accordingly, particular notches to be cut by the laser beam in the outer surface of the drum transversely of the drum axis will each be of a length such that the desired lengths of the cutting edges of the steel strips will be provided when the strips are fitted in those notches.

13 Claims, 14 Drawing Figures

APPARATUS FOR CUTTING MOULD NOTCHES FOR STRIP STEEL CUTTING TOOLS

The invention relates to an apparatus for cutting mould notches for strip steel cutting tools by means of a laser beam, with a machine frame and adapted for movement in both axes thereon a support carriage for the laser cutting set.

Strip steel cutting tools are used for the production of collapsible box blanks in the packaging industry. The tool base plate consists as a rule of thick plywood into which, in the case of conventional operative practice, in order to produce the mould form corresponding to the developed view of the collapsible box, notches are cut by means of a nibbling or fret saw. Subsequently, knife-like strips of sheet steel are inserted into the notches. By virtue of the need to make numerous holes in the base plate to assist sawing and by reason of the fact that the saw cuts have to be made by hand, this method of mould construction is extremely involved and necessitates a considerable degree of precision work by craftsmen.

Strip steel cutting tools are produced in the manner previously described for both flat blanking machines and also rotary blanking machines. In the latter case, it is not a flat tool base plate which is used as the starting element, but plywood halves of a hollow cylinder.

Dimensionally accurate transfer of the blank form presents in this case particular difficulties if the dimensions of the blank are not capable of being transferred easily and directly to the surface of the hollow cylinder for all the strip steel cutting edges which extend exactly in the axial direction of the hollow cylinder. The reason for this is the fact that the radian measure between individual strip steel cutting edges is by virtue of the radial projection of these edges beyond the surface of the hollow cylinder greater than the corresponding radian measure between the mould notches on the surface of the hollow cylinder. However, since the dimensions present between the strip steel cutting edges are intended to correspond to the dimensions of the box blank, the radian measures projected onto the surface of the hollow cylinder have to be reduced.

Recently, apparatus of the type described at the outset (magazine entitled "Verfahrenstechnik and Produktion", 18th May 1978, pp. 12 et seq.), has been in use for the production of flat strip steel cutting tools. In the case of these advantageous apparatuses, the saw blade is replaced by a laser beam which does not, as in the case of sawing, remove the material from the notch by cutting; instead, it carries it away thermally, i.e. vaporises it. The flat base plate of the tool is in this case fixed on the machine frame and the laser cutting set is guided along the edges of the blank by the support carriage. Since with constant output of the laser, it is necessary to work with a regular rate of feed unless unusable notches of uneven width are to result, then in practice, provision is made for an automated relative speed between laser beam and tool base plate. The drives used for the purpose are, according to the state of the art, numerically controlled via punched tape, so that precise notches for dimensionally accurate moulds with absolutely identical mould dimensions can be produced when it is necessary to make a plurality of slots in one tool base plate. For laser cutting, collapsible box standards are already available which embrace the most usual types of folding box, so that the conditions are already satisfied for computer-controlled laser-cut moulds. The known numerically controlled apparatus for cutting moulds by means of a laser beam is however suitable only for making cuts in plane tool base plates. Hollow cylinders for rotary strip steel cutting tools cannot be machined on the known punched tape controlled apparatus.

The invention is based on the problem of making the per se advantageous laser cutting technique also useful for the production of rotary strip steel cutting tools in order to achieve a higher degree of precision, simplification and a reduction in the cost of producing such tools.

On a basis of the apparatus of the type described at the outset, this problem is resolved in that (a) disposed on the support carriage beneath the laser cutting set and at a right-angle to the laser beam and thus disposed in a central plane there is a mounting shaft for a hollow cylindrical drum which is to be provided with notches for the fitment of sheet steel strips, the said mounting shaft being parallel with one of the two movement axes of the support carriage, (b) on the mounting shaft and concentric therewith is a drive wheel which engages a rectilinear rolling path or guide member mounted on the machine frame parallel with the plane of movement of the support carriage, and (c) the effective rolling diameter or engagement surface of the drive wheel corresponds to a cutting edge diameter of the strips of sheet steel to be fitted into the drum, wherein the cutting edge diameter is defined by the radial positions of the cutting edges of the steel strips beyond the outer surface of the drum.

In the case of the apparatus according to the invention, movements of the support carriage in that of its two axes of movement which extends at a right-angle to the mounting shaft results in the drum moving in relation to the laser beam as a result of the drive wheel rolling on the rolling path. In this manner which is as simple as it is effective, the laser cut is effected with movement of the support carriage in the aforementioned axis progressively at whichever is the higher point of the drum adjacent to the laser cutting set. During movements of the support carriage in the direction of its movement axis which extends parallel with the mounting shaft, the drive wheel does not roll along the rolling path so that in this case the drum is stationary. In the event of simultaneous movements in both axes of movement of the support carriage, the drum is rotated in the direction of the axis which extends at a right-angle to the mounting shaft but only as determined by the support carriage movement.

On account of the feature (c), the laser cut already occurs automatically in the correct diminution of the radian measures, whereby the relevant rolling path corresponds to the rectilinear measurement of the blank. Therefore, when the apparatus according to the invention is used, the punched tape controlled programmes for the production of flat moulds can readily be used also for the production of moulds on rotary strip steel cutting tools. The apparatus according to the invention is certainly not limited to the application of punched tape controlled movement processes. The laser cutting set can also be controlled for example via the optical scanning of a drawn original of the collapsible box blank with appropriate transfer of movement to the laser cutting set. In any case, the support carriage moves, as with the machining of plane tool base plates, only in the two axes of one plane, whereby the drum is moved positively and automatically in the event of movements in one axis of movement in relation to the laser cutting set. By virtue of the feature (c), it is not necessary for any conversions to be made from linear paths of the collapsible box blank to reduced radian measures.

In a preferred form of embodiment of the apparatus, it is envisaged that the mounting shaft be mounted for vertical adjustment and for rotation on bearing arms rigidly connected to the support carriage and that the drive wheel be exchangeably fixed on the drive shaft. As a result of these measures, the apparatus can be adjusted to the various usual rotary drum diameters by a simple adjustment of the height of the mounting shaft, exchange of the drive wheel also permitting the diameter to be adapted to suit the diameter of the cutting edges.

In order to achieve a positive form-locking rolling drive of the drum, it is advantageous for the drive wheel to be a gear wheel and for the rolling path to be a rack complementary to it. With a suitable choice of friction coefficients, it may however also be sufficient to construct the drive wheel as a friction wheel which is in frictional engagement with the correspondingly constructed rolling path.

It is expedient for the drum to be mounted on the mounting shaft by being held by means of clamping discs fitted concentrically and fixed against relative rotation on the mounting shaft. Although the preferred material for the drum is plywood, it is possible in principle to use any materials including suitable synthetic plastics materials, into which dimensionally accurate mould notches can be incorporated by means of a laser beam.

Described hereinabove is an apparatus which makes it possible to employ laser cutting techniques already advantageously used for cutting mould notches in flat tool base elements, i.e. tool base plates, also for the production of rotary strip steel cutting tools, i.e. for making laser cuts in hollow cylindrical tool base elements, possibly employing computer controlled cutting programmes developed for making laser cuts in tool base plates. Particular problems arise in connection with cuts to be made in a peripheral direction, because the dimensions of the blank cannot be readily transferred directly to the surface of the hollow cylinder for all the strip steel cutting edges which do not extend exactly in the axial direction of the hollow cylinder, on account of the different radian measures of the strip steel cutting edges projecting beyond the surface of the hollow cylinder, and the associated notches.

According to the idea underlying the invention, the hollow cylinder or the drum is, during execution of all cuts which do not extend directly in the axial direction of the drum, rotatingly driven via a drive wheel, the rolling circle diameter or engagement surface of which corresponds to the cutting edge diameter of the strips of sheet steel which are later to be fitted into the drum. The action of rolling over the rolling circle diameter will occur thereby along a distance which corresponds to the cutting edge length on the finished tool. In this way, the laser cut occurs automatically and already with the correct shortening of the radian measure of the cutting edges.

In the case of the apparatus which has been taken as the premise hereinabove, the laser cutting set is disposed on a support carriage which is adapted for movement in both axes on a machine frame holding the base element of the tool, in order to apply the notches to the base plate of the tool. When this apparatus is used for producing rotary strip steel cutting tools, the aforesaid drive wheel is according to the invention engaged with a rectilinear rolling path or guide member fixed on the machine frame parallel with the plane of movement of the support carriage, so that during movements of the support carriage in the direction of the associated movement axis the drive wheel rolls along the rolling path and the hollow cylindrical base element of the tool is rotated, whereby the laser cut occurs with the movement of the support carriage in the aforesaid axis progressively and at all times at the highest situated point on the drum which is adjacent to the laser cutting set.

The invention is also based on the problem of rendering the idea basically underlying the invention applicable also to differently constructed apparatuses and/or other systems of driving the aforesaid drive wheel.

On the basis of an apparatus for the cutting of mould notches for strip steel cutting tools by means of a laser beam and having a machine frame and a support carriage adapted for movement in both axes thereon, but in which, in contrast to the apparatus described at the outset, the laser cutting set is mounted on the machine frame, i.e. is rigid, a first alternative form of embodiment of the invention is characterised in that (a) there is disposed on the machine frame beneath the laser cutting set and at a right-angle to the laser beam and thus disposed in a central plane a mounting shaft for a hollow cylindrical drum which is to be provided with notches for fitment of strips of sheet steel, the mounting shaft being located parallel with one of the two movement axes of the support carriage, (b) there is mounted concentrically on the mounting shaft a drive wheel which meshes with a rectilinear rolling path or guide member mounted on the support carriage parallel with the plane of movement of the support carriage and at a right-angle to the mounting shaft, and (c) the effective rolling diameter or engagement surface of the drive wheel corresponds to the cutting edge diameter of the strips of sheet steel later to be fitted into the drum.

In the case of this form of embodiment, the drum is disposed in a stationary position below the likewise stationary laser cutting set and is driven by movements of the support carriage in the axis of movement extending at a right-angle to the drive shaft, by the rolling path which is propelled together with the support carriage.

Preferably also in the case of this form of embodiment of the apparatus, it is envisaged that the mounting shaft is mounted for vertical adjustment and for rotation on bearing arms rigidly connected to the machine frame and in that the drive wheel be interchangeably mounted on the drive shaft. As a result of this measure, as already is true of the apparatus as described at the outset, it is possible by simple vertical adjustment of the mounting shaft to adjust the apparatus to the various customary rotary drum diameters whereby, by changing the drive wheel, it is possible also to effect an adaptation of diameters in respect of the cutting edge diameter. This possibility is basically provided also in all the forms of the embodiment which are to be explained hereinafter.

In the case of the previously described first alternative form of embodiment of the invention, it is advantageous for a disposition to be adopted whereby, instead of the rectilinear rolling path, there is provided on the support carriage a positioning wheel the central axis of which is parallel with the mounting shaft and which is driven by a positioning motor fixed on the support carriage and which engages the drive wheel when the support carriage is so adjusted in respect of its axis of movement which extends at a right-angle to the mounting shaft that the central axis of the positioning wheel is in the common central plane of the laser beam and of the mounting shaft. In this respect, the wheel driven by the positioning motor takes over the function of the rectilinear rolling path. It is also possible in this way to achieve programme controlled cutting cycles if the positioning motor receives the corresponding control pulses, i.e. is in each case rendered live for a period of time which is proportional to the desired distance of the rolling movement on the wheel or drive wheel of the drum which is connected to the motor. It is functionally appropriate to use the positioning motor which is reversible in its direction of rotation and which is stabilised against hunting.

The apparatus according to the first alternative form of embodiment of the invention can however also be so constructed that instead of a rectilinear rolling path mounted on the support carriage, a rectilinear rolling path is provided which is guided for displacement on the support carriage parallel with the plane of movement and at a right-angle to the mounting shaft and on which there is fixed a nut which is in driving connection with a threaded spindle driven by a positioning motor mounted on the support carriage, the threaded spindle passing through the nut parallel with the rolling path on the support carriage and being rotatable but non-displaceable in relation to the support carriage, the support carriage being fixed in respect of its movement axis extending at a right-angle to the mounting shaft. In this case, the threaded spindle, in the fashion of a feed rod, takes over the movement of the rolling path and thus the relative rotation of the drum in relation to the laser cutting set during notch cuts in a peripheral direction, i.e. cuts which do not extend parallel with the drum axis. It goes without saying that the disposition may also be such that the threaded spindle is directly enmeshed with a correspondingly toothed drive wheel on the drum.

On a basis of the nature of the first alternative form of embodiment of the invention, a second alternative embodiment is characterised in that (a) on the support carriage below the laser cutting set there is adapted for movement at a right-angle to the laser beam and thus into a common central plane a mounting shaft for a hollow cylindrical drum which is to be provided with notches for fitment of strips of sheet steel, the mounting shaft being disposed parallel with one of the two movement axes of the support carriage, (b) concentrically mounted on the mounting shaft is a drive wheel which is in driving engagement with a positioning wheel the centre axis of which is parallel with the mounting shaft and which is adapted to be driven by a positioning motor fixed on the support carriage, when the mounting shaft and the laser beam are in a common central plane, and (c) the effective rolling diameter of the drive wheel corresponds to the cutting edge diameter of the strips of sheet steel which are later to be fitted into the drum.

According to a third alternative form of embodiment of the invention, on a basis of the type mentioned at the outset it is envisaged that (a) adjustable on the machine frame beneath the laser cutting set and at a right-angle to the laser beam and thus in a common central plane is a mounting shaft for a hollow cylindrical drum which is to be provided with mould notches for fitment of strips of sheet steel, the mounting shaft being disposed parallel with one of the two movement axes of the support carriage, (b) concentrically mounted on the mounting shaft is a drive wheel in driving engagement with a positioning wheel, the central axis of which is parallel with the mounting shaft and which is adapted to be driven by a positioning motor fixed on the support carriage when its central axis the mounting shaft and the laser beam are in a common central plane, and (c) the effective rolling diameter of the drive wheel corresponds to the cutting edge diameter of the strips of sheet steel later to be fitted into the drum.

Where all the alternative forms of embodiment of the invention and naturally also the embodiment which was described in the first instance are concerned, it is of advantage to mount on the mounting shaft inside the drum and extending substantially continuously over the length of the drum a freely rotatable container to catch solid residues from the laser cutting, the container being held in a vertical position by appropriate counter weights. This container should always be disposed below the laser cutting set so that it can catch all the residues falling from the relevant notch.

All developments of the apparatus which fall within the scope of the alternative embodiments of the invention are basically also suitable for the application of laser cuts to flat basic tool elements. In other words, all apparatuses constructed for making laser cuts on flat basic tool elements can, in accordance with one of the alternative forms of embodiment of the invention, also be utilised for the production of rotary strip steel cutting tools.

The invention is described in greater detail and with reference to further features hereinafter with reference to the accompanying drawings which diagrammatically illustrate an example of embodiment of the invention. In the drawings.

During the ensuing explanation of the drawings, for the designation of identical or functionally corresponding parts, reference numerals are used concordant with those already used for the corresponding parts in the main patent.

Figure 1:
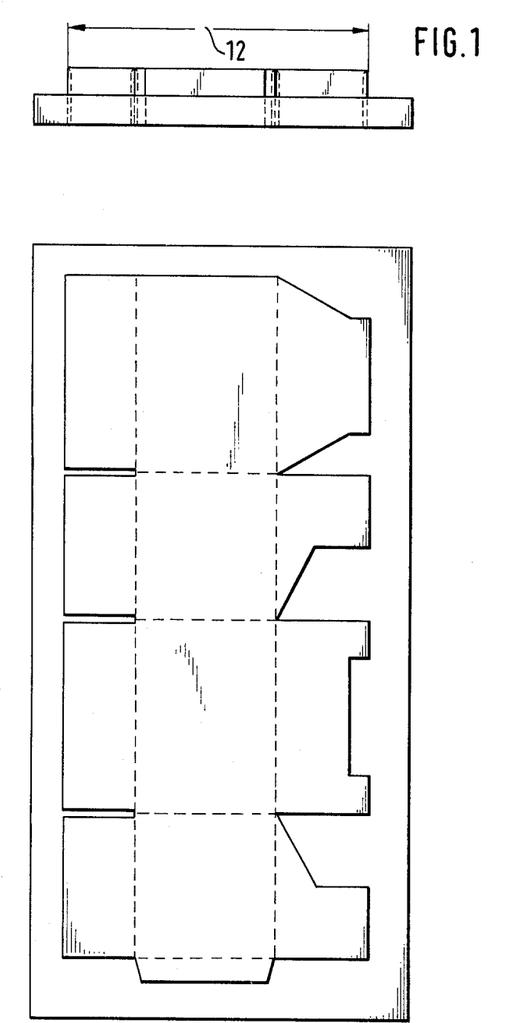
FIG. 1 shows two elevations of a flat strip steel cutting tool.
Figure 2:
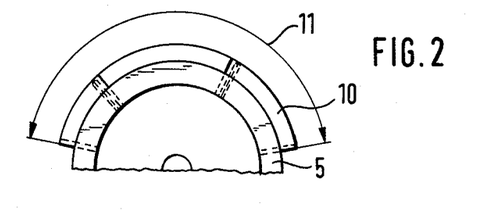
FIG. 2 shows two elevations of a rotary strip steel cutting tool.
Figure 3:
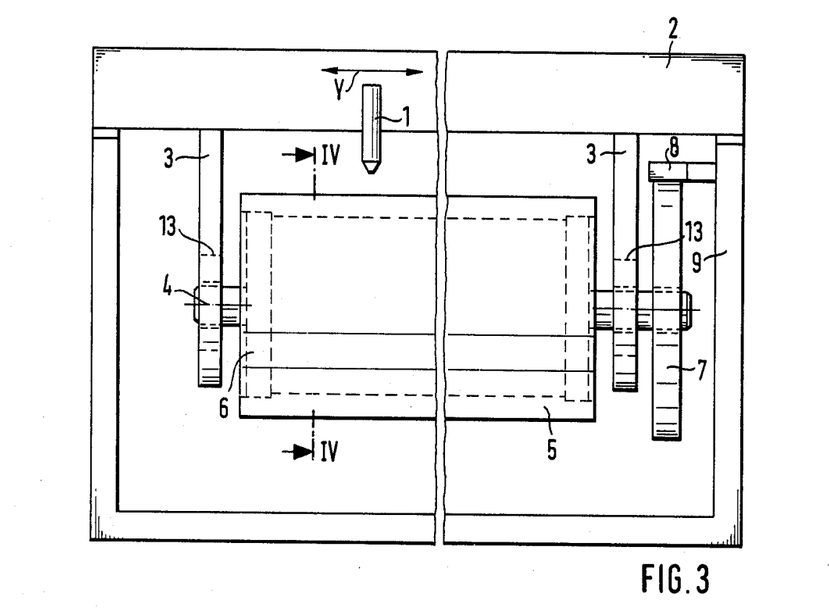
FIG. 3 is a front view of a laser beam cutting installation incorporating the apparatus according to the invention.
Figure 4:
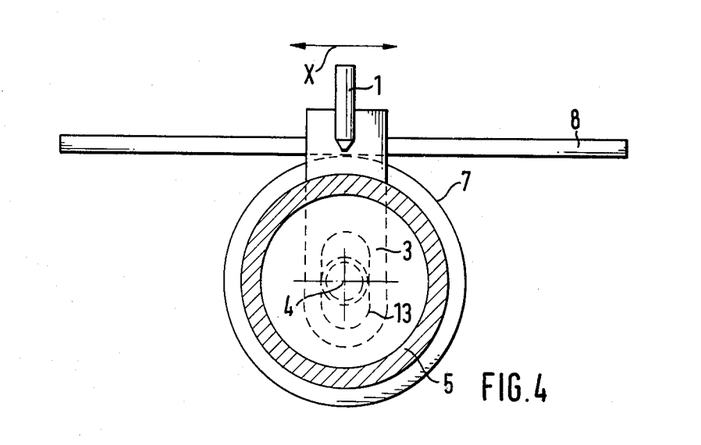
FIG. 4 is a section taken on the line IV—IV in FIG. 3.

By way of explanation of the apparatus, reference is first made to FIGS. 3 and 4. The laser cutting set 1 is, by means of the support carriage 2, on which it is mounted, capable of being moved on the machine frame 9 to any point over the flat cutting area. Mobility of the laser cutting set 1 in the two axes of movement which are indicated in FIG. 3 by the "Y" direction arrows and FIG. 4 by the "X" directional arrows, can be provided by a compound slide arrangement, a pantographic link arrangement or the like. Rigidly bolted to the support carriage 2 are two bearing arms 3, so that the central line of the mounting shaft 4 which is rotatably mounted on the bearing arms is in one plane with the central line through the laser cutting set 1. The mounting shaft 4 is vertically adjustable for the various diameters of the drums which are constructed as plywood cylinders 5, as is indicated by the slot arrangement 13 provided in both bearing arms 3. The plywood cylinder 5 is held centrally on the mounting shaft 4 by the clamping discs 6. The drive of the mounting shaft 4 and thus of the clamping discs 6 and of the plywood cylinder 5 is effected via the gearwheel or friction wheel 7 which rolls along the rack or friction surface 8 respectively, whichever of the latter is used being rigidly connected to the machine frame 9. The pitch circle diameter of the gearwheel or the diameter of the friction wheel 7 is identical to the cutting edge diameter of the arcuate strip of sheet steel 10 (FIG. 2) which will later be fitted. The identity of the two diameters of gearwheel or friction wheel 7 and of the strip of sheet steel 10 has the effect that the extended length of the radian measure 11 (FIG. 2) is identical to the rectilinear measure 12 (FIG. 1) of a corresponding flat strip steel cutting tool for which the laser beam cutting installation may be programmed.

Figure 5:
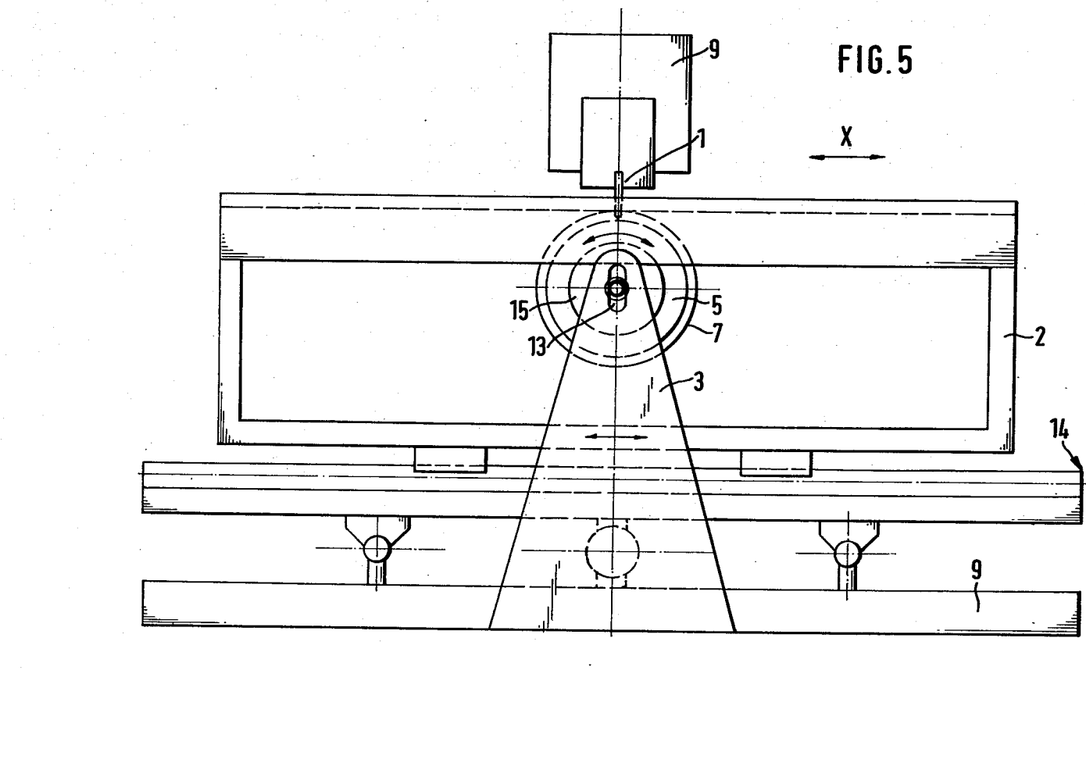
FIG. 5 is a front view of a laser beam cutting installation incorporating a first alternative form of embodiment of apparatus according to the invention.
Figure 6:
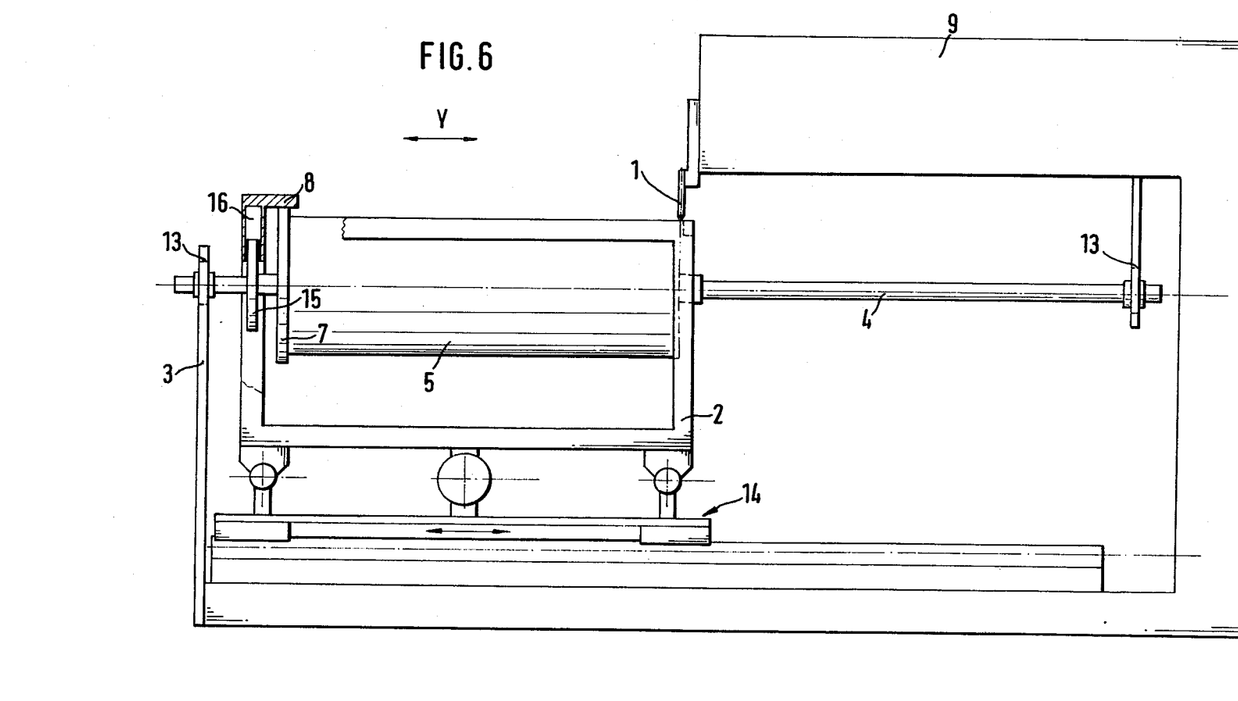
FIG. 6 is a side view of the installation and apparatus according to FIG. 5.

In the case of the first alternative form of embodiment shown in FIGS. 5 and 6, the laser cutting set 1 is mounted on the machine frame 9. The support carriage 2 is capable of being propelled on the machine frame 9 by means of a compound slide arrangement generally designated 14 so that it can be moved to any point over the flat cutting area. As this happens, the support carriage 2 moves in two axes of movement which are indicated in FIG. 5 by the "X" directional arrow and in FIG. 6 by the "Y" directional arrow. Beneath the laser cutting set 1 and at a right-angle to the laser beam and thus disposed in a central plane is the mounting shaft 4 which is rotatably mounted on two bearing arms 3 fixed on the machine frame 9. The mounting shaft 4 is vertically adjustable for the various diameters of drum constructed as plywood cylinders 5, as indicated by the slot arrangement 13 which is provided in both bearing arms 3. The plywood cylinder 5 is centrally and rotationally rigidly connected to the mounting shaft 4 by means of clamping discs which are not shown here. The drive of the mounting shaft 4 and thus of the plywood cylinder 5 is effected via the drive wheel 7 which is constructed as a gear wheel or a friction wheel and which rolls along the rolling path 8 which is correspondingly constructed as a rack or as a friction surface, as the case may be. The rolling path 8 is rigidly connected to the support carriage 2. In the event of movements of the support carriage 2 in the direction of the "Y" arrow (FIG. 6), the plywood cylinder 5 or the clamping discs which hold it will be capable of displacement on the mounting shaft 4 while retaining their rotationally rigid connection. So that the relative location of the plywood cylinder 5 in respect of the support carriage 2 is not lost thereby, there is mounted on the mounting shaft 4 a holding disc 15 which engages into a corresponding recess 16 (FIG. 6).

The effective rolling diameter or engagement surface of the drive wheel 7, i.e. the pitch circle diameter in the case of a gear wheel or the outside diameter in the case of a friction wheel, is identical to the cutting edge diameter of the arcuate strip of sheet steel which will later be fitted into the plywood drum.

Figure 7:
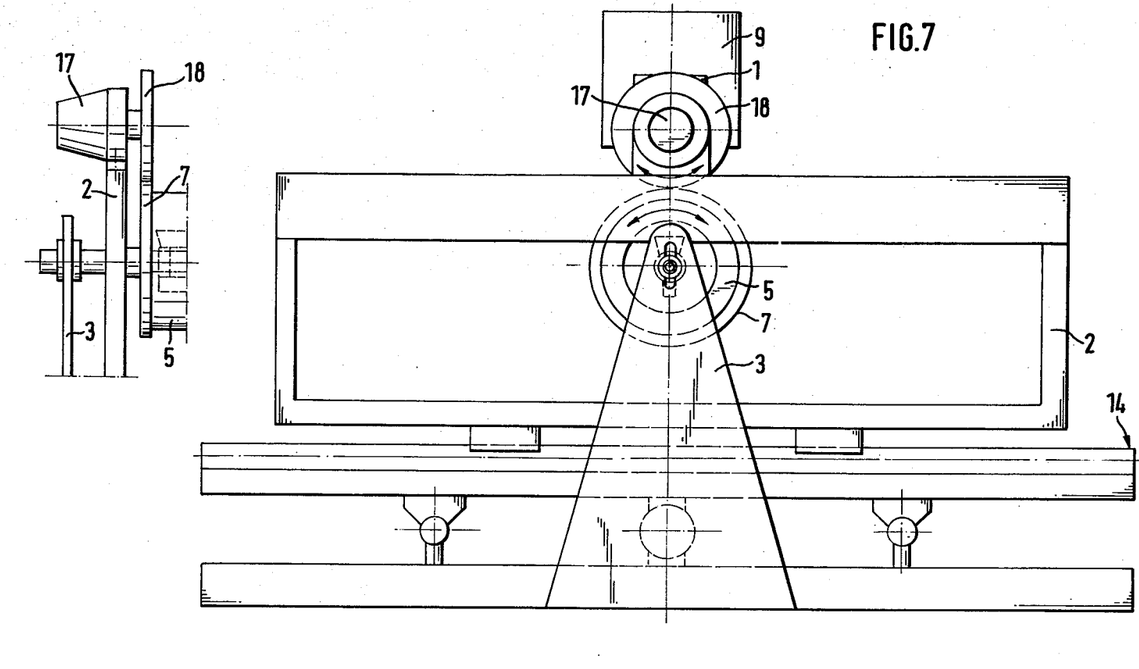
FIG. 7 is a front view similar to that in FIG. 5 but showing a laser beam cutting installation with a modified apparatus.

In the case of the modified form of embodiment shown in FIG. 7, there is mounted on the support carriage 2 a positioning motor 17 the shaft of which carries an output or positioning wheel 18. This wheel 18, preferably a gearwheel, meshes with the drive wheel 7, in this case likewise a gearwheel, for the plywood cylinder 5, when the support carriage 2 is so adjusted by means of the compound slide arrangement 14 that the central axis of the wheel 18 is in the common central plane of the laser beam and of the mounting shaft 4. The positioning motor 17, the direction of rotation of which is reversible, brings about via the wheel 18 a driving of the plywood drum 5 via the drive wheel 7, whereby the rolling path common to the pair of wheels 18, 7 corresponds to the cutting edge length of the strip of sheet steel (not shown) which will later be fitted. The mould notch cut by means of the laser cutting set 1 is of shorter length in comparison therewith, as already described.

Figure 8:
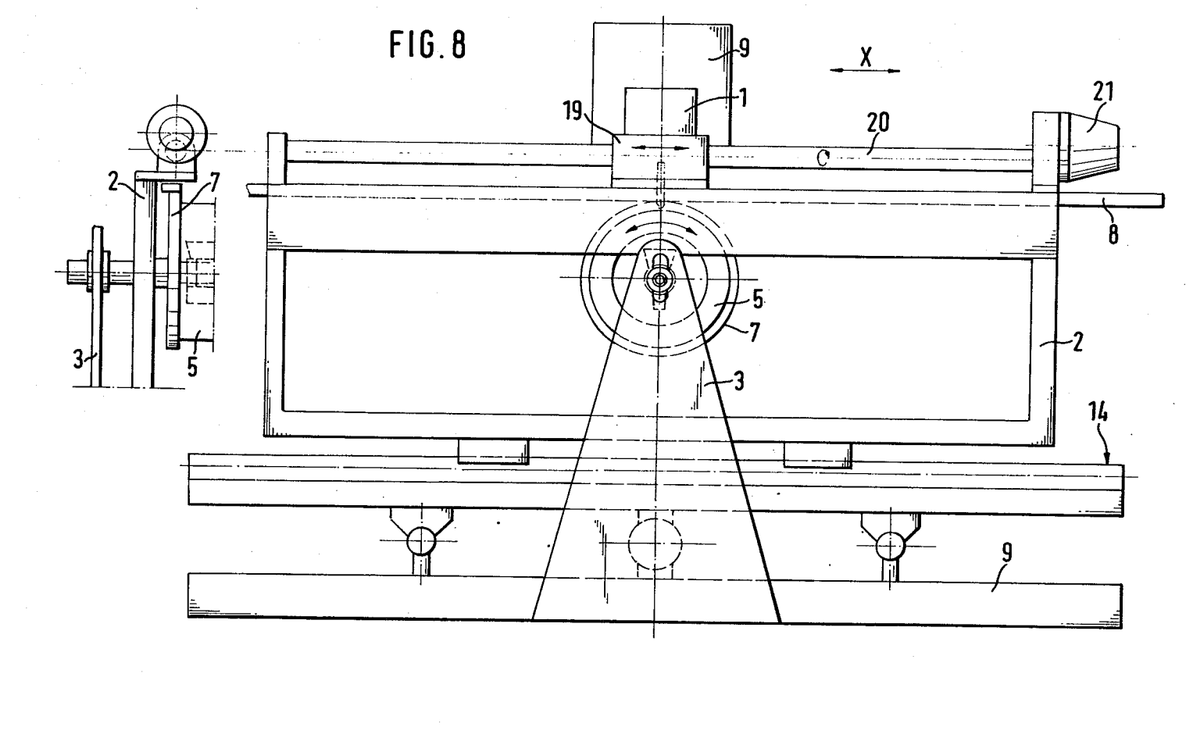
FIG. 8 is a front view similar to that in FIGS. 5 and 7 but with a further modification of the apparatus.

In the case of the modified form of embodiment shown in FIG. 8, there is displaceably guided on the support carriage 2 a rectilinear rolling path 8, for example a rack, which meshes with, in this case, the toothed drive wheel 7. Rigidly connected to the rolling path 8 is a nut 19 through which passes a threaded spindle 20 which is in screw-threaded engagement with the nut and which is rotatably but non-displaceably mounted on the support carriage 2. The threaded spindle 20 is driven by a positioning motor 21 the direction of rotation of which is reversible. When the support carriage 2 is stopped in respect of the "X" axis of movement, driving rotations of the threaded spindle 20 bring about displacements of the nut 19 and thus of the rolling path 8 which in turn transmits its sliding movement to the drum 5 via the drive wheel 7. On the left alongside FIG. 8 is a broken-away side view of the driving situation.

Figure 9:
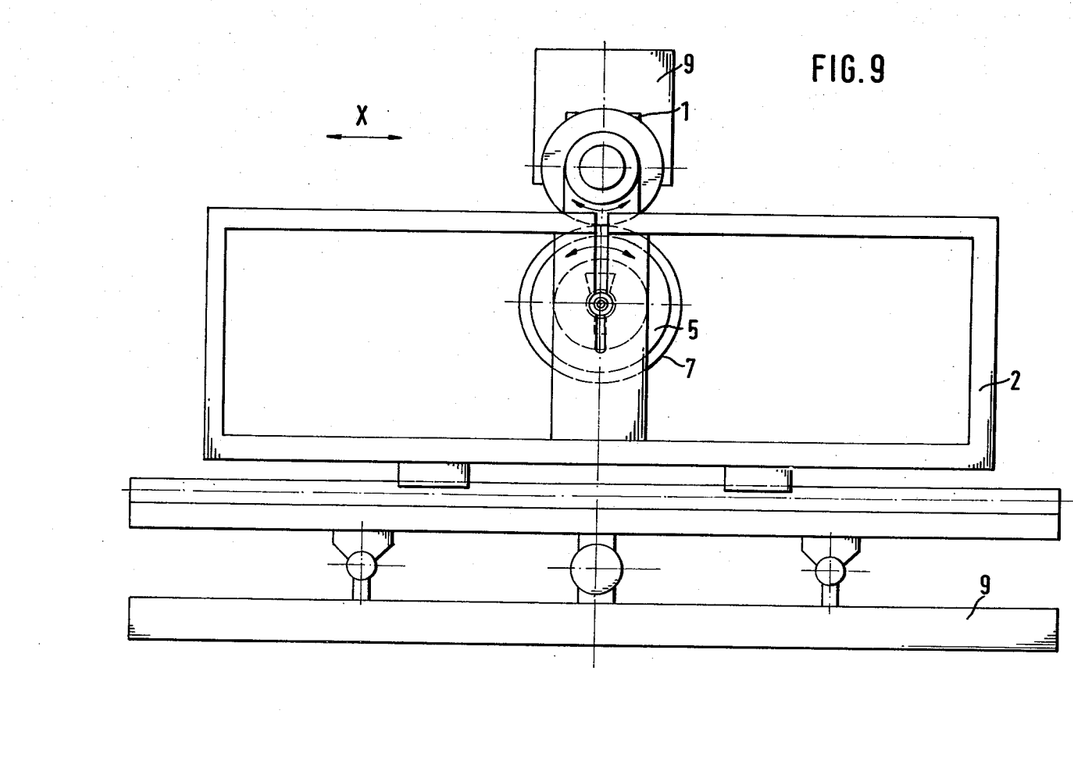
FIG. 9 is a front view of a laser beam cutting installation incorporating an apparatus in accordance with the invention and in keeping with a second alternative form of embodiment thereof.
Figure 10:
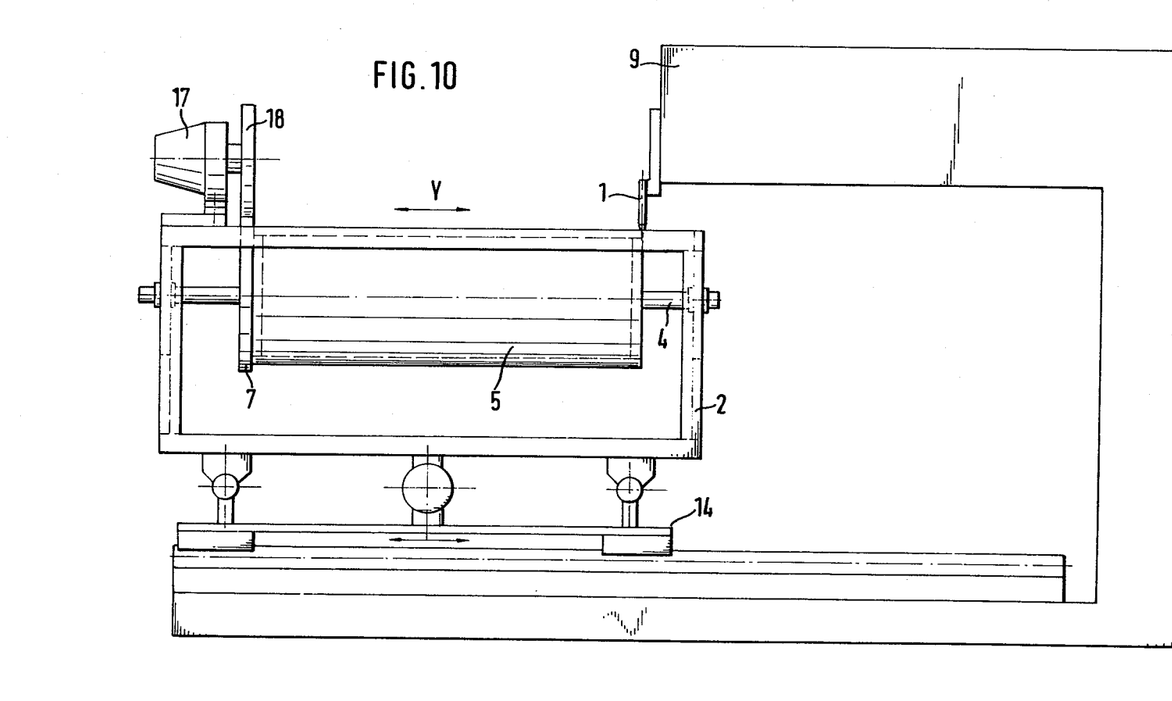
FIG. 10 is a side view of the installation and apparatus according to FIG. 9.

In the case of the second alternative form of embodiment shown in FIGS. 9 and 10, in contrast to the embodiment described in respect of FIGS. 5 and 6, the mounting shaft 4 and thus the plywood drum 5 is rotatably mounted on the support carriage 2 together with all the parts connected to them. Disposed in a common central plane with the mounting shaft 4 is once again a directionally reversible positioning motor 17 which is mounted on the support carriage 2 which drives the drive wheel 7 via a wheel 18. The arrangement shown is in the position intended for laser cuts on the periphery of the plywood drum when the support carriage 2 is so adjusted in respect of its "X" axis of movement (FIG. 9) that the axis of the wheel 18, the axis of the mounting shaft 4 and the centre of the laser beam are in a common central plane. This position is reproduced in the drawings.

Figure 11:
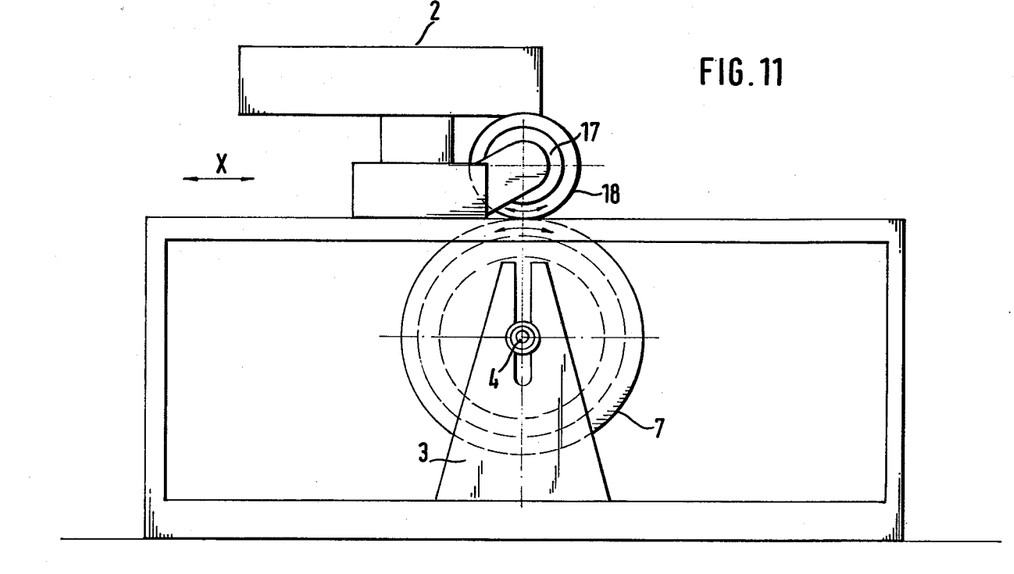
FIG. 11 is a front view of a laser beam cutting installation incorporating an apparatus according to the invention, in keeping with a third alternative form of embodiment of the apparatus.
Figure 12:
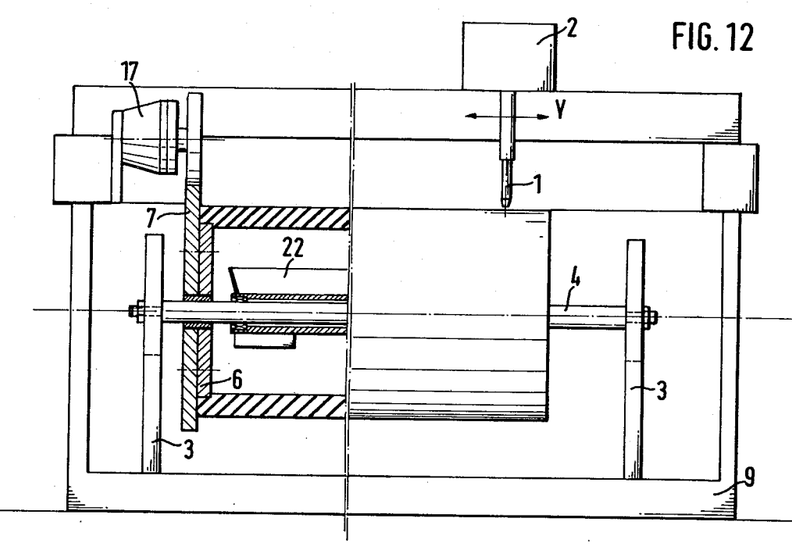
FIG. 12 is a side view of the installation and apparatus according to FIG. 11.

In the case of the third alternative form of embodiment which is shown in FIGS. 11 and 12, the laser cutting set 1 is again mounted for displacement on the fixed machine frame 9 in respect of the "X" and "Y" directional arrows. The support carriage 2 used for the purpose is of substantially the same construction as a compound slide guide arrangement. The bearing arms 3 for the mounting shaft 4 are mounted on the machine frame 9. The drive wheel 7 which is in rotationally rigid communication with the plywood drum 5 via the clamping disc 6 is drivingly connected to the output wheel 18 of a positioning motor 17 which in this case is again mounted on the support carriage 2. The arrangement illustrated is, as shown in the drawings, functionally ready to make peripheral laser cuts when the axis of the wheel 18, of the mounting shaft 4 and of the laser beam are in a common central plane in respect of the axis of movement represented by the "X" directional arrow (FIG. 11). The arrangement shown in FIGS. 11 and 12 can also and from the outset be designed exclusively to produce rotary strip steel cutting tools. In this case, it is sufficient if the laser cutting set 1 can only carry out movements along the axis of movement (FIG. 12) represented by the "Y" directional arrow. In this case, a compound guide or a support carriage 2 which is constructed after the manner of a compound slide arrangement is not required.

Figure 13:
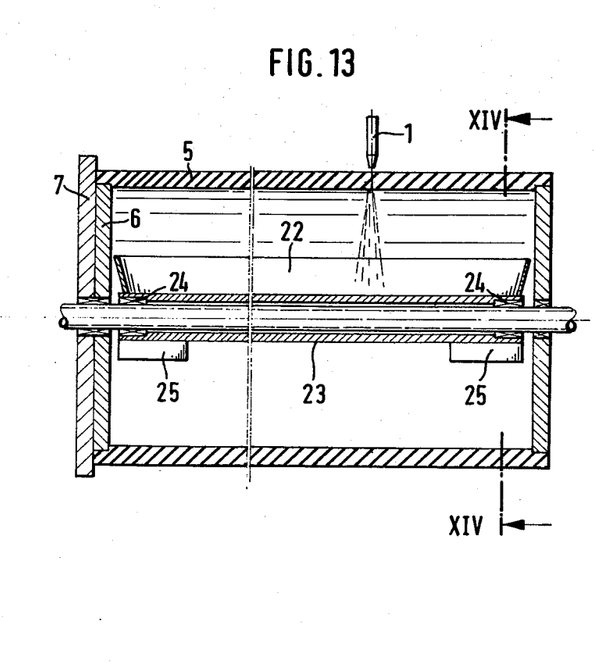
FIG. 13 is a longitudinal section through a drum with a container mounted therein.
Figure 14:
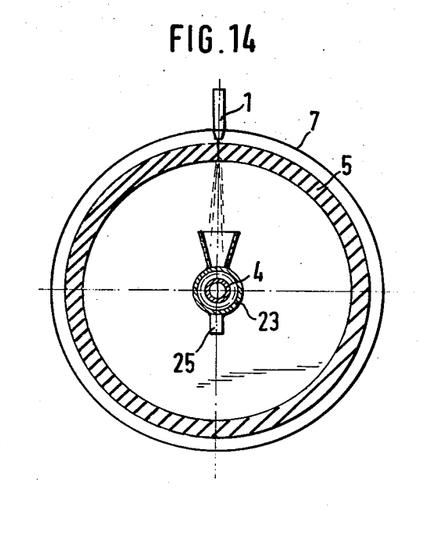
FIG. 14 is a section taken on the line XIV—XIV in FIG. 13.

Shown inside the plywood drum 5 in FIG. 12 is a container 22, for more detailed description of which reference should now be made to FIGS. 13 and 14. A container 22 extends substantially over the length of the interior of the plywood drum 5 which is defined laterally by the clamping discs 6. It is mounted on a portion of tube 23 which is mounted through bearings 24 to be freely rotatable on the mounting shaft 4. Diametrically opposite the container 22 are counterweights 25 which ensure that the container is always in a vertical position. As indicated in the drawings, the container which widens out at the top, is always underneath the laser cutting set so that solid residues falling from the notch which is being cut drop into the container 22. In order to empty the container, it is quite adequate, after the plywood drum 5 has been removed, to rotate it so on the mounting shaft 4 that its receiving aperture is directed downwardly. At the same time, it is the purpose of the container to screen off the laser beam striking it. For this purpose, the container may be lined with suitable laser beam resistant materials, e.g. refractory bricks.

The aforedescribed installations are in themselves intended for the laser cutting of mould notches for flat strip steel cuts. The various forms of embodiment of apparatus according to the invention now make it possible to use these installations also for the production of mould notches for rotary moulds. In this case, the driving motor of the support carriage or of the laser cutting set which brings about movement in a radial direction in relation to the drum, is only used in order to bring the drum axis into a plane of centres with the central axis of the laser beam. When this position is reached, this driving motor is switched off and the positioning motor which is additionally provided in the case of the examples of embodiment which are involved here is controlled as dictated by the path-time pulses of the programme keyed in by the computer and identical to the programme used for flat strip steel cuts.

While specific embodiments of the invention have been shown and described in detail to illustrate the application of the inventive principles, it will be understood that the invention may be embodied otherwise without departing from such principles.

I claim:

1. Apparatus for cutting notches in the outer circumferential surface of a hollow cylindrical drum to allow sheet steel strips to be fitted in the notches in the drum to form a cutting tool, each of the steel strips having a cutting edge of a desired length which edge is positioned a certain radial distance outwardly from the outer circumferential surface of the drum to define a cutting edge diameter, comprising a machine frame, a laser cutting set for providing a laser beam extending in a certain direction for cutting the notches in a drum, a carriage for supporting said laser cutting set, said carriage being movable on said machine frame along two mutually perpendicular axes which define the plane of movement for said carriage, a mounting shaft on said carriage adapted to support a drum coaxial with the axis of said mounting shaft for rotating the drum about the axis of said mounting shaft, said mounting shaft extending perpendicularly of the certain direction of the laser beam and parallel to one of the axes along which said carriage is movable and spaced from the plane of movement of said carriage, a drive wheel coaxially fixed to said mounting shaft for rotating said mounting shaft, said drive wheel having a radially outer circumferential engagement surface being adapted to correspond to the cutting edge diameter of the sheet steel strips to be fitted into the drum adapted to be supported on said mounting shaft, and an elongated guide member fixed to said machine frame and extending parallel to said plane of movement of said carriage for contacting said engagement surface and rotating said drive wheel for rotating a drum mounted on said mounting shaft when said carriage is moved relative to said guide member so that the length of notches cut by the laser beam in the outer circumferential surface of the drum mounted on said mounting shaft in a direction transverse of the axis of said mounting shaft are shorter than the comparable lengths of the cutting edges of the steel strips to be fitted into the transversely extending notches in accordance with the relation between the radial dimensions of the cutting edge and the outer circumferential surface of the drum from the axis of said mounting shaft.

2. Apparatus according to claim 1, including a pair of support arms fixed to said carriage for supporting said mounting shaft for rotation about the axis of said shaft, said support arms are arranged so that said mounting shaft can be adjusted to a desired position in the certain direction of the laser beam, and means for detachably mounting said drive wheel to said mounting shaft.

3. Apparatus according to claim 1, wherein said drive wheel comprises a gear wheel and said elongated guide member comprises a rack gear for engaging said gear wheel.

4. Apparatus according to claim 1, wherein said drive wheel comprises a friction wheel and said elongated guide member has a friction surface for engaging said friction wheel.

5. Apparatus according to claim 1 including a pair of clamping disks fixed coaxially to said mounting shaft for holding a drum stationary relative to said mounting shaft.

6. Apparatus for cutting notches in the outer circumferential surface of a hollow cylindrical drum to allow sheet steel strips to be fitted in the notches in the drum to form a cutting tool, each of the steel strips having a cutting edge of a desired length which edge is positioned a certain radial distance outwardly from the outer circumferential surface of the drum to define a cutting edge diameter, comprising a machine frame, a laser cutting set for providing a laser beam extending in a certain direction for cutting the notches in a drum, a carriage for supporting said laser cutting set, said carriage being movable on said machine frame along two mutually perpendicular axes which define the plane of movement for said carriage, a mounting shaft on said carriage adapted to support a drum coaxial with the axis of said mounting shaft for rotating the drum about the axis of said mounting shaft, said mounting shaft extending perpendicularly of the certain direction of the laser beam and parallel to one of the axes along which said carriage is movable and spaced from the plane of movement of said carriage, a drive wheel coaxially fixed to said mounting shaft for rotating said mounting shaft, said drive wheel having a radially outer circumferential surface being adapted to correspond to the cutting edge diameter of the sheet steel strips to be fitted into the drum adapted to be supported on said mounting shaft, and means for engaging said engagement surface and for rotating said drive wheel to rotate a drum mounted on said mounting shaft so that the length of notches cut by the laser beam in the outer circumferential surface of the drum mounted on said mounting shaft in a direction transverse of the axis of said mounting shaft are shorter than the comparable lengths of the cutting edges of the steel strips to be fitted into the transversely extending notches in accordance with the relation between the radial dimensions of the cutting edge and the outer circumferential surface of the drum from the axis of said mounting shaft.

7. Apparatus according to claim 6, including a pair of support arms fixed to said carriage for supporting said mounting shaft for rotation about the axis of said shaft, said support arms are arranged so that said mounting shaft can be adjusted to a desired position in the certain direction of the laser beam, and means for detachably mounting said drive wheel to said mounting shaft.

8. Apparatus according to claim 6, wherein said engaging means comprises an elongated guide member on said support carriage and said guide member extends parallel to said plane of movement of said support carriage and perpendicular to the axis of said mounting shaft.

9. Apparatus according to claim 6, wherein said engaging means comprises a positioning motor mounted on said support carriage and having a drive shaft in parallel relation with the axis of said mounting shaft, a positioning wheel mounted on said drive shaft of said positioning motor for rotation on about the axis of said drive shaft with the positioning wheel axis being parallel to the axis of said mounting shaft, and said positioning wheel being engageable with said drive wheel when said support carriage is moved in the direction perpendicular to the axis of said mounting shaft so that the axis of said positioning wheel extends in a plane defined by the direction of the laser beam and the axis of said mounting shaft.

10. Apparatus according to claim 6, wherein said engaging mean comprises an elongated guide member on said support carriage, said guide member being movable in its long direction perpendicular to the axis of said mounting shaft and being parallel to the plane of movement of said support carriage, and including a nut fixed to said guide member, a threaded spindle for engaging said nut wherein said spindle extends parallel to said guide member and is mounted on said support carriage for rotation about the axis of said spindle, said spindle being fixed against movement in its long direction relative to said carriage, said carriage being stoppable against movement in the direction perpendicular to the axis of said mounting shaft, and a positioning motor mounted on said carriage for rotatably driving said spindle when said carriage is stopped against movement in the direction perpendicular to the axis of said mounting shaft.

11. Apparatus for cutting notches in the outer circumferential surface of a hollow cylindrical drum to allow sheet steel strips to be fitted in the notches in the drum to form a cutting tool, each of the steel strips having a cutting edge of a desired length which edge is positioned a certain radial distance outwardly from the outer circumferential surface of the drum to define a cutting edge diameter, comprising a machine frame, a laser cutting set for providing a laser beam extending in a certain direction for cutting the notches in a drum, a carriage for supporting said laser cutting set, said carriage being movable on said machine frame along two mutually perpendicular axes which define the plane of movement for said carriage, a mounting shaft on said carriage adapted to support a drum coaxial with the axis of said mounting shaft for rotating the drum about the axis of said mounting shaft, said mounting shaft extending perpendicularly of the certain direction of the laser beam and parallel to one of the axes along which said carriage is movable and spaced from the plane of movement of said carriage, a drive wheel coaxially fixed to said mounting shaft for rotating said mounting shaft, said drive wheel having a radially outer circumferential engagement surface being adapted to correspond to the cutting edge diameter of the sheet steel strips to be fitted into the drum adapted to be supportd on said mounting shaft, a positioning wheel with the axis thereof being parallel to the axis of said mounting shaft for contacting said engagement surface and rotating said drive wheel when said mounting shaft and said laser beam are in a common plane, and a positioning motor fixed on said support carriage for rotatably driving said positioning wheel wherein notches to be cut by the laser beam in the outer circumferential surface of the drum in a direction transverse of the axis of said mounting shaft are shorter than the comparable lengths of the cutting edges of the steel strips to be fitted into the transversely extending notches in accordance with the relation between the radial dimensions of the cutting edge and the outer circumferential surface of the drum from the axis of said mounting shaft.

12. Apparatus for cutting notches in the outer circumferential surface of a hollow cylindrical drum to allow sheet steel strips to be fitted in the notches in the drum to form a cutting tool, each of the steel strips having a cutting edge of a desired length which edge is positioned a certain radial distance outwardly from the outer circumferential surface of the drum to define a cutting edge diameter, comprising a machine frame, a laser cutting set for providing a laser beam extending in a certain direction to cut the notches in a drum, a carriage for supporting said laser cutting set, said carriage being movable on said machine frame along two mutually perpendicular axes which define the plane of movement for said carriage, a mounting shaft on said carriage adapted to support a drum for rotating the drum about the axis of said mounting shaft, said mounting shaft extending perpendicularly of the certain direction of the laser beam and parallel to one of the axes along which said carriage is movable and spaced from the plane of movement of said carriage, a drive wheel coaxially fixed to said mounting shaft for rotating said mounting shaft, said drive wheel having a radially outer circumferential engagement surface being adapted to correspond to the cutting edge diameter of the sheet steel strips to be fitted into the drum adapted to be supported on said mounting shaft, a positioning wheel the axis of which is parallel to and spaced from the axis of said mounting shaft for contacting said engagement surface and rotating said drive wheel when the axis of said positioning wheel, the axis of said mounting shaft and the laser beam are in a common plane, and a positioning motor fixed to said support carriage for rotatably driving said positioning wheel wherein notches to be cut by the laser beam in the outer circumferential surface of the drum mounted on said mounting shaft in a direction transverse of the axis of said mounting shaft are shorter than the comparable lengths of the cutting edges of the steel strips to be fitted into the transversely extending notches in accordance with the radial dimensions of the cutting edge and the outer circumferential surface of the drum from the axis of said mounting shaft.

13. Apparatus according to claim 6, 11 or 12 including a container having an elongated opening and being arranged to catch residue of the drum when the notches are cut by the laser beam, wherein said container being supported on said mounting shaft and arranged to be located inside the drum for rotation relative to the axis of said mounting shaft and said opening having a length arranged to extend substantially continuously for the axial length of the drum, and includng at least one counterweight on said container for maintaining said opening below the laser beam as said mounting shaft is rotated to allow the residue to fall by gravity into said container.

* * * * *